United States Patent
Sandhaus

(10) Patent No.: US 7,269,790 B2
(45) Date of Patent: Sep. 11, 2007

(54) METHOD AND SYSTEM FOR IN-REGISTER PROCESSING OF PRINT DATA

(75) Inventor: Christoph Sandhaus, München (DE)

(73) Assignee: Oce Printing Systems GmbH, Poing (DE)

( * ) Notice: Subject to any disclaimer, the term of this patent is extended or adjusted under 35 U.S.C. 154(b) by 282 days.

(21) Appl. No.: 10/239,968

(22) PCT Filed: Apr. 10, 2001

(86) PCT No.: PCT/EP01/04114

§ 371 (c)(1),
(2), (4) Date: Sep. 25, 2002

(87) PCT Pub. No.: WO01/77806

PCT Pub. Date: Oct. 18, 2001

(65) Prior Publication Data

US 2003/0090714 A1    May 15, 2003

(30) Foreign Application Priority Data

Apr. 11, 2000  (DE) ............................. 100 17 928

(51) Int. Cl.
*G06F 15/00* (2006.01)
(52) U.S. Cl. .................. 715/527; 715/526; 358/1.1
(58) Field of Classification Search ........ 715/526–527, 715/530; 358/1.1, 1.9, 1.18, 3.18, 3.1, 3.9
See application file for complete search history.

(56) References Cited

U.S. PATENT DOCUMENTS

| | | | |
|---|---|---|---|
| 5,233,685 A * | 8/1993 | Landes et al. ............... 715/542 |
| 5,630,042 A * | 5/1997 | McIntosh et al. ............ 715/744 |
| 5,675,753 A | 10/1997 | Hansen et al. |
| 5,682,541 A * | 10/1997 | Martin ........................ 715/507 |
| 5,852,442 A | 12/1998 | Morito |
| 5,953,007 A * | 9/1999 | Center et al. ................ 715/764 |
| 5,963,641 A | 10/1999 | Crandall et al. |
| 5,995,985 A * | 11/1999 | Cai ............................. 715/507 |
| 6,012,083 A * | 1/2000 | Savitzky et al. ............. 709/202 |
| 6,353,450 B1 * | 3/2002 | DeLeeuw .................... 715/768 |
| 6,411,315 B1 * | 6/2002 | Young ......................... 715/788 |
| 6,529,285 B2 * | 3/2003 | Bobrow et al. ............. 358/1.12 |
| 6,661,530 B1 * | 12/2003 | Munetomo et al. ........ 358/1.15 |
| 6,694,487 B1 * | 2/2004 | Ilsar ........................... 715/527 |

(Continued)

OTHER PUBLICATIONS

Ray et al., "Using Microsoft Excel 97", copyright 1997, pp. 166-177.*
"Adobe Photoshop 5.0" (Photoshop), copyright 1998, pp. 98-99 and 395-398.*

(Continued)

*Primary Examiner*—Stephen Hong
*Assistant Examiner*—Thu V. Huynh
(74) *Attorney, Agent, or Firm*—Schiff Hardin LLP

(57) ABSTRACT

In a method and system for processing print data, the print data is displayed on a display device before printing, and the print data is displayed together with a check device or reticule that is displaceable at the display device. Both the print data as well as the check device are processed as transparent layers in a browser, where the check device is a dynamic element. The method and the system make it possible to check the registration precision or, in-register quality both by pages as well as within a page for print data of a print job that is divided into a plurality of pages.

24 Claims, 5 Drawing Sheets

U.S. PATENT DOCUMENTS

| | | | |
|---|---|---|---|
| 6,766,495 B1* | 7/2004 | Bates et al. | 715/531 |
| 6,832,351 B1* | 12/2004 | Batres | 715/505 |
| 6,903,839 B1* | 6/2005 | Laverty et al. | 358/1.15 |
| 2002/0063877 A1* | 5/2002 | Lucivero et al. | 358/1.13 |
| 2004/0169876 A1* | 9/2004 | Takahashi | 358/1.12 |
| 2004/0205608 A1* | 10/2004 | Huang | 715/521 |
| 2004/0210833 A1* | 10/2004 | Lerner et al. | 715/512 |

OTHER PUBLICATIONS

Excel Printout (hereinafter Printout), copyright 1999, pp. 1-3.*

Ray et al., "Using Microsoft Excel 97", copyright 1997, pp. 21, 90-91 and 166-177.*

Argyriou, Anthony (hereinafter Argyriou), "Paint-Shop-Pro Frequently Asked Questions", http://64.233.161.104/search?q=cache:-YVnbTpSyhEJ:www.sonic.net/ ~argyriou/psp/faq.html+print+bitmap+image+raster+pixel-by-pixel+1999&hl=en&gl=us&ct=clnk&cd=27&client=firefox-a, copyright 1999, pp. 1-24.*

"USIGS Glossary", http://www.fas.org/irp/agency/nima/nug/gloss_b.html, p. 1-17, published Feb. 17, 1999, teaches bitmap is also referred as a raster image.*

Microsoft Excel Printout (hereinafter Excel), copyright 1999, pp. 1-47.*

Dr. G. Goldmann, "PRISMApro Server System", Druckerbuch, Edition 4a, May 1999, pp. 12-1 to 12-17.

Stefan Muenz, "SELFHTML: Version 7.0 of Apr. 27, 1998", 1998, http://www.teamone.de/selfaktuell.

* cited by examiner

METHOD AND SYSTEM FOR IN-REGISTER PROCESSING OF PRINT DATA

BACKGROUND OF THE INVENTION

1. Field of the Invention

The present invention is directed to a method and a system for processing print data. It is particularly directed to system for processing larger print jobs wherein a print job comprises a plurality of documents and/or pages. It is therefore suited for application in print production environments as occur in larger computer centers or in what is referred to as the "printing on demand" (PoD) market.

2. Description of the Related Art

Such print production systems are described, for example, in the publication *Das Druckerbuch*, edited by Dr. Gerd Goldmann, OÓce Printing Systems GmbH, Edition 4a, May 1999 (ISBN 3-00-001019-x), pages 12-1 through 12-17. Pages 12-9 through 12-11 in this publication describe what is referred to as a print job manager with which print jobs (also referred to as job tickets) can be generated in an ordinary (or arbitrary) computer (referred to here as a client PC) linked to a computer network, and the print jobs generated in this way can be transmitted to a system component (for example, an order distribution system) for further-processing and ultimate printout.

During the course of processing a print job that precedes the actual printing event on a printer device, it is often desirable to check the printed result in advance (referred to as a preview). U.S. Pat. No. 5,963,641 discloses a method and device for processing print data the satisfies this desire.

The preview function becomes especially important in network-based print production environments wherein a plurality of user terminals (client PCs) are connected to a shared network, as are one or more print servers that administer print data generated by the users or by a host printer and forward them to one or more high-performance printers. This is especially true of print data streams wherein the print data is composed of a plurality of data sources, for example of a variable data stream and of static resource data to be integrated therein. Examples of such data streams are what is referred to as the Advanced Function Presentation Data Stream (AFPDS) or the Mixed Object Documents Contents Architecture data stream (MO:DCA).

The AFPDS data stream as well as an image viewer which is suitable for the data are described, for example, in documentation number S54405285-00 of International Business Machines Corporation (IBM) bearing the title "AFP Conversion and Index Facility (ACIF) Users Guide". The MO:DCA data stream is described, for example, in IBM document number SC31-6802-04 bearing the title "Mixed Object Document Content Architecture Reference".

Networked devices are being increasingly utilized in printing processes, and the devices are driven or monitored by means of standard computer programs such as, for example, known browser programs. Such Internet browsers are, for example, the Microsoft Internet Explorer® browser operating under the Windows operating system, the Netscape Navigator® browser or the browser Opera that can also be employed under the Linux operating system. Such browser programs are often included in the standard software package of personal computers and are thus available at nearly every newer type of personal computer.

The Netscape Navigator browser supports what is referred to as a layer technique that is programmable in the JavaScript programming language. The object layer that lies below the document object in the JavaScript® object hierarchy thereby provides the possibility of obtaining access to all layers that are defined in an HTML data file.

A new layer object is automatically generated when the browser program encounters a layer in the HTML data file.

Layers can be addressed in various ways with JavaScript®, for example with the commands "document.layers[#].Property=Value"
"document.layers[#].Method o"
"Color=document.layers [0].bgColor"
"document.LayerName.Property=Value"
"document.LayerName.Methodo" and
"Color=document.Headerarea.bgColor"

A layer can thereby be addressed with an index number and "document.layers". Which layer in the data file is to be called follows this in brackets. Each layer that was noted in HTML with the <layer>-tag or with the <ilayer>-tag counts. The layers can also be addressed with "document.LayerName" and the name can be indicated that was specified in the attribute "name=" in the introductory <layer>/<ilayer>-tag in the definition of the graphic.

Further details about this layer technique are described, for example, in the book "SELFHTML: Version 7.0 of 27 Apr. 1998" by Stefan Müz that can be ordered via the Internet.

The aforementioned publications and patents are herewith incorporated by reference into the present specification.

When processing print jobs, PoD applications demand that successive pages of a document be printed exactly registered, particularly when producing bound brochures.

SUMMARY OF THE INVENTION

The present invention is to provide a method and a system with which a page-by-page, exactly registered printing is enabled.

This is achieved by a method for processing print data, whereby the print data are displayed on a display device before printing, whereby the print data are displayed together with a check device (reticule) that is displaceable at the display device. This is also achieved by computer software that that effects a method execution according to the foregoing when loaded on a computer. The invention encompasses a computer program product that effects the foregoing method execution when loaded on a computer, as well as a computer system that effects a method execution and additionally encompasses a printing system comprising a computer system to effect the method.

BRIEF DESCRIPTION OF THE DRAWINGS

The invention is explained in greater detail below and by way of example on the basis of the drawings.

Further details and exemplary embodiments of the invention are described in greater detail below on the basis of a few Figures.

DETAILED DESCRIPTION OF THE PREFERRED EMBODIMENTS

According to the principles of the present invention, the print data to be processed for a print job are displayed on a display device before the printing. The print data are thereby displayed together with a check device that is displaceable on the display device. The display thereby ensues with a browser program such as, for example, Netscape Navigator that supports the aforementioned layer technique. The invention can thus be advantageously used in a broad scope without a major outlay.

In a preferred exemplary embodiment of the invention, the print data are already present in a rastered print data format such as, for example, MO:DCA, TIF, JPG, or IOCA in which they are later supplied to a printer device for printing. In particular, both these print data as well as the check device in the browser are processed as transparent layers in a browser. The invention is based on the perception that dynamic elements can be generated in browsers with such layers and that such elements can be employed as a check device when processing print data.

In particular, the check device is a reticule that comprises two lines arranged along axes residing perpendicular to one another that can be dynamically displaced independently of one another parallel to the other axis and whose positions along the respective other axis can be respectively fixed independently of one another. Each of the two lines thus represents a sub-element of the check device (or reticule). It is thereby advantageous when each of these sub-elements is processed in the browser as a separate layer. The lines of the reticule are displayed, in particular, in a graphic mode that contrasts with the other display areas, for example in color (for example, red).

The present method, in particular, makes it possible to check the print data of a print job that is divided into a plurality of pages page-by-page and to also check them within a page in view of their exact registration or, respectively, whether they are in-register. To that end, the check device (or reticule) is positioned and fixed at a position prescribed by the edge of the displayed print data. The next page or, respectively, the following pages are then displayed and their position relative to the fixed check device is determined. When a discrepancy occurs, for example a spacing between the fixed check device and the following pages, then corresponding correction measures can be initiated, for example correction values for shifting print pages can be input or a shift value (a shift) with which the later printing is controlled can be determined by undoing the fixing of the positioning means or, respectively, dynamic element and subsequent re-positioning of the check device corresponding to the following page. It is especially advantageous for this purpose when the position of the check device on the display device is automatically acquired in a coordinate system and the coordinate values corresponding to the position are stored.

Figure 1:
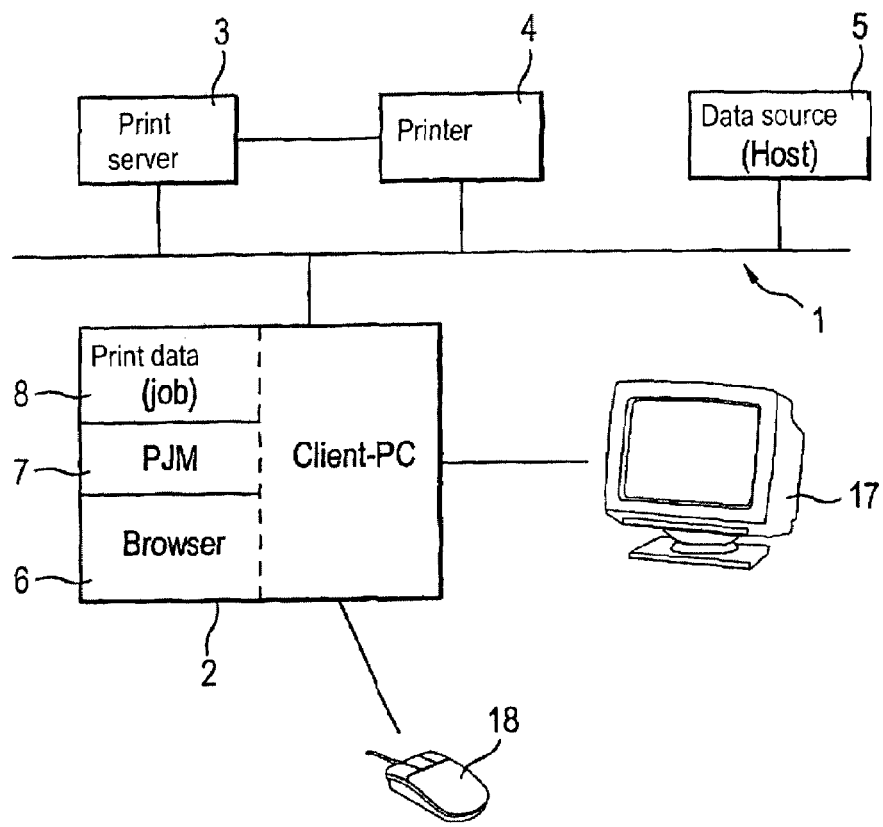
FIG. 1 is a functional block diagram showing a print production environment.

FIG. 1 shows a print production environment wherein one of several user computers 2, a print server 3, a printer device 4 and a separate print data source 5 (a host computer) are connected via a computer network such as, for example, a local area network (LAN) or a wide area network (WAN). The user computer 2 communicates, in particular, with the print server 3 via a specific connection software such as, for example, the PRISMA +POD software described on pages 12-1 through 12-17 in the above-cited publication OCE-Druckerbuch that runs under the PRISMA PRO system.

Among other things, a browser software 6 (such as Netscape Communicator) is installed on the user PC 2 for this purpose.

The browser software 6 thereby communicates with the print job manager 7, the PRISMA+POD software.

Print data that were fetched from the print server 3 or the host computer 5 by the print job manager can thereby be intermediately stored in a further memory area 8 of the user computer 2.

The user computer 2 also comprises a picture screen 7 as well as a mouse 8 employed for the input control.

Figure 2:
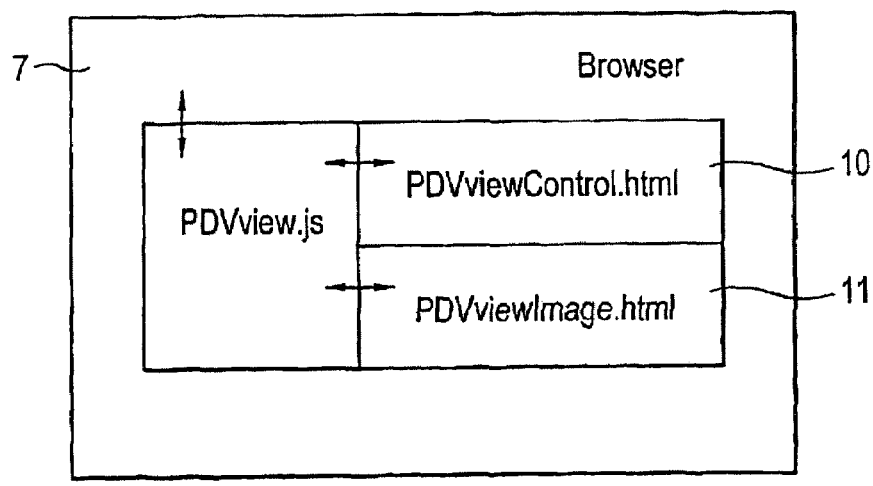
FIG. 2 is a block diagram of a program structure.

FIG. 2 shows how the browser software 7 collaborates with a software "PDVView.js" 9 programmed under JavaScript® whose listing is appended to the end of the specification as Appendix 1.

The JavaScript program 9 has recourse, first, to the HTML code "PDVViewControl.Html" 10 as well as to the HTML code "PDVViewImage.Html" 11 that are appended as Appendices 2 and 3. HTML means Hyper Text Markup Language, and reticule references are defined as "Grid" in the listings; the layer-related definitions and functions can likewise be clearly seen.

Figure 7:
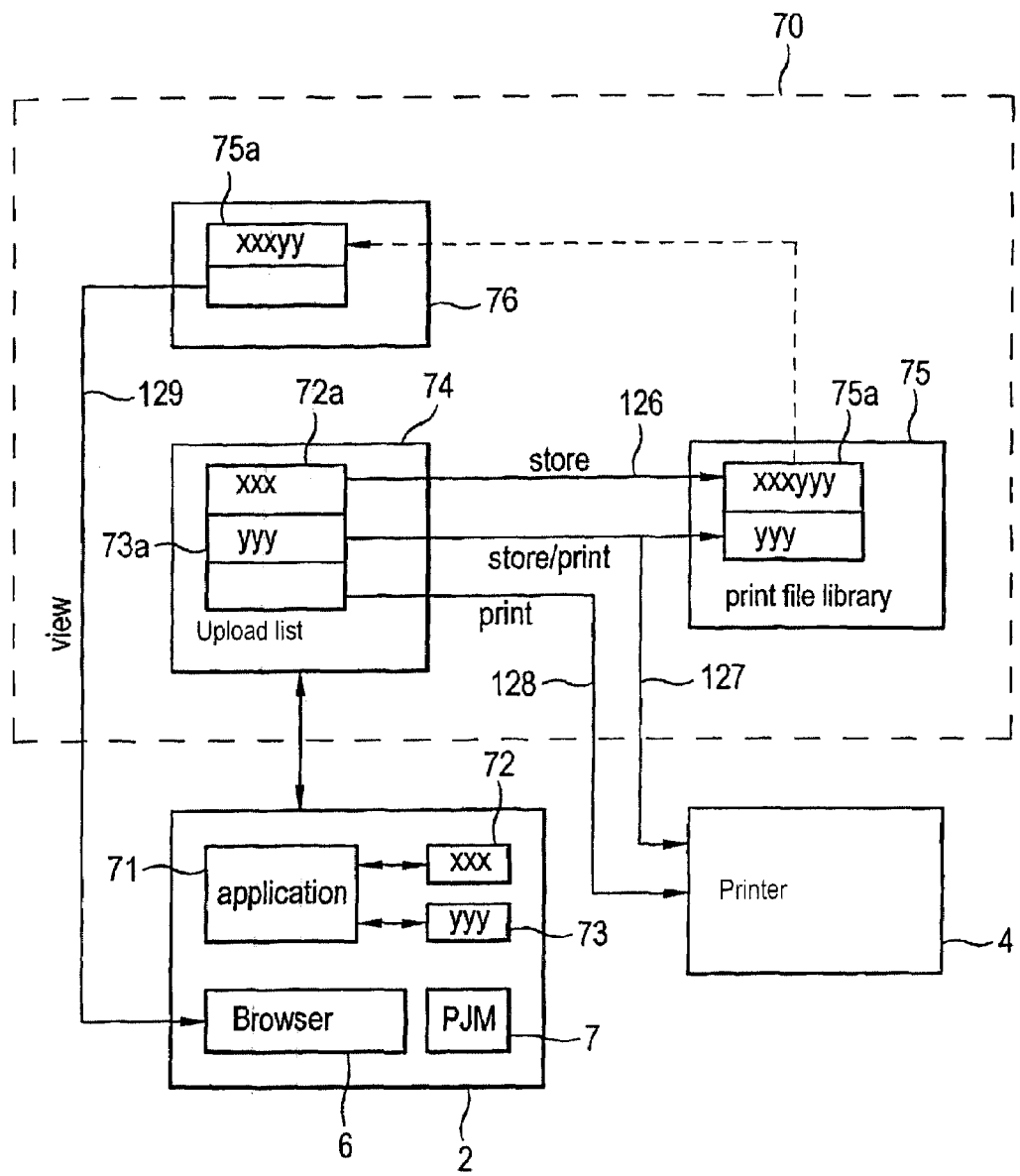
FIG. 7 is a functional block diagram of a system structure.

FIG. 7 shows essential system components and the corresponding executive sequence that are used during the course of producing, further-processing and printing out a document.

In a memory domain 70 that, for example, is in the print server 3 (FIG. 1) or distributed, too, over a plurality of computers in the network, the objects 72 and 73 generated in the client PC 2 by means of a user program 71 such as, for example, a text processing program can be transmitted by means of an upload storage event from the client PC 2 into the corresponding storage computer and can be stored thereat. To that end, the memory domain 70 comprises one or more upload lists 74 as well as a library 75 for print data files (print file library) in which print jobs that have already been finished are stored. In particular, the storing thereby ensues on a permanent storage such as a hard disk of the print server 3.

Figure 3:
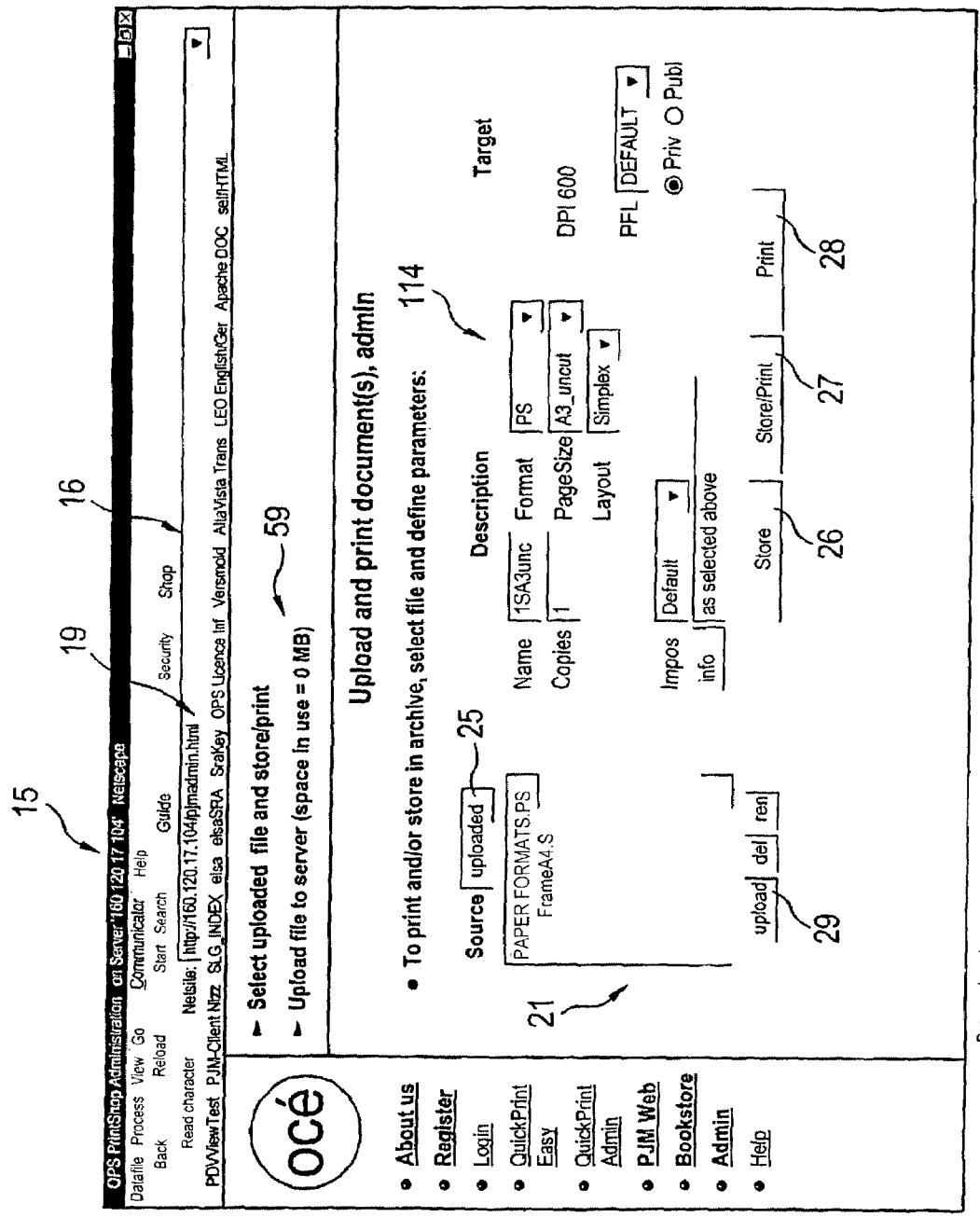
FIG. 3 is a load picture screen menu.

After the data files 72 and 73 produced in the program 71 have been entered into the upload list and deposited there in the memory areas 72a and 73a, the print job manager software 7 can unite these to a complete print job and store them in the print file library 75 as job datafile 75a by actuating the key 26 (see FIG. 3). This ensues in an event 126.

Alternatively to the storing 126, a datafile contained in the upload list 74 can also be both stored in the print file library 76 as well as supplied to the printer 4 for the printout in the event 127 by actuating the button 27. Printing from the upload list 74 corresponding to the method execution 128 is also possible via button 28 (see FIG. 3).

Figure 4:
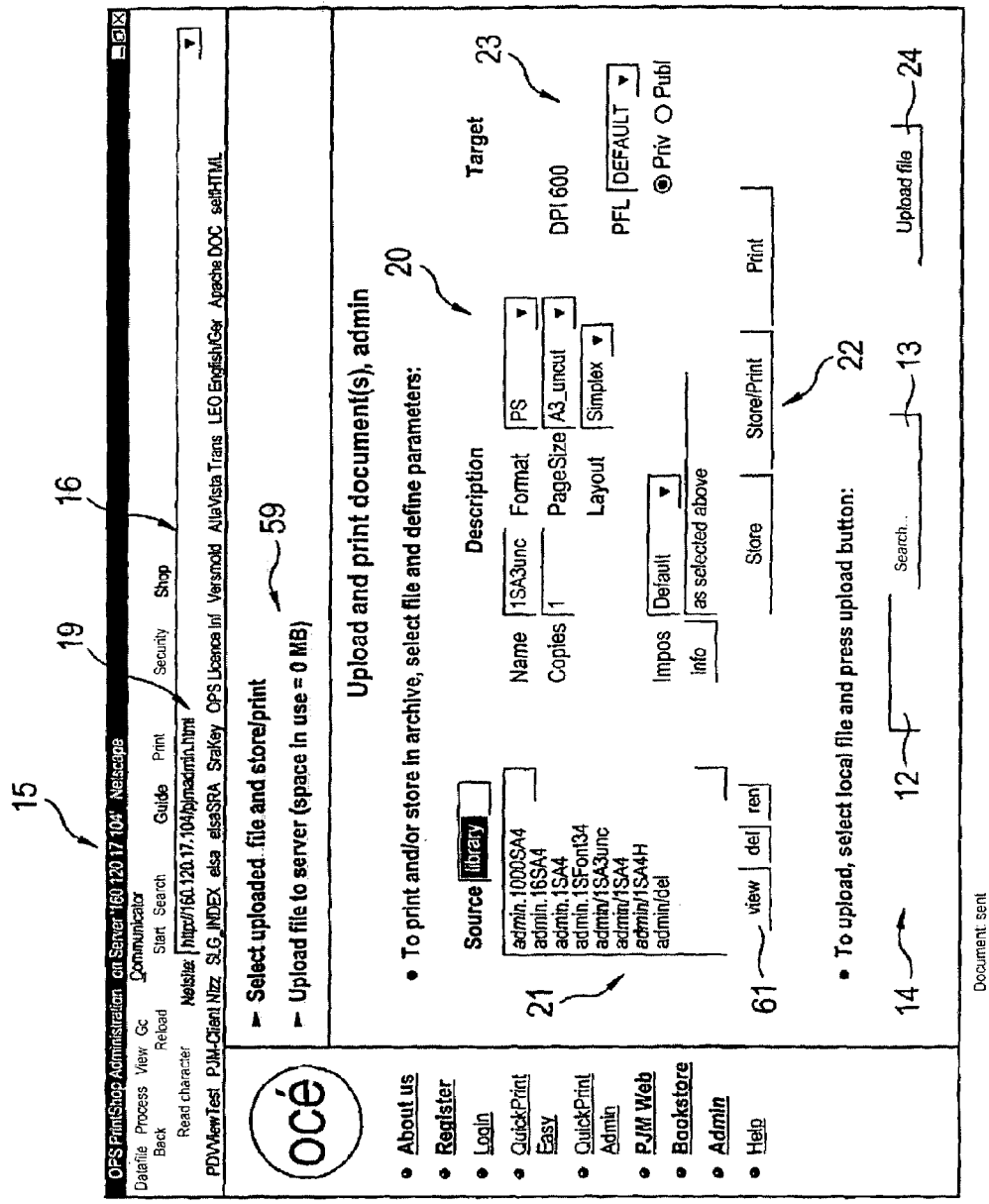
FIG. 4 is a start picture screen menu.

A document datafile 75a stored in the library 75 (a print file library) can be transmitted to the client PC 2 in a transmission event 129 by actuating the button 61 (see FIG. 4). Before the transmission, a check is carried out to see whether the data file 75a is present in a rastered data format such as IOCA, TIF, GIF or JPG that can be displayed by the browser 6. When this is not the case, for example when the datafile stored in the library 75 is coded in an AFP, PCL of PostScript format, a raster module 76 converts it into a predetermined, rastered format such as, for example, JPG before it can be transmitted to the client PC 5 or be displayed by the browser. The datafile transmitted or, respectively, converted in this way is then displayed with the browser 6 (see FIGS. 5 and 6).

For printing according to the events 127 and 128, the data transmitted from the upload list 24 to the printer 4 are offered in a data format that is matched to the data formats that can be processed by the printer, for example in the format AFP, PCL or PostScript.

FIG. 3 shows a display window 15 that is displayed on the picture screen 17 of the user computer 2 after calling the browser software 6 and the print job manager (PJM) software 7. In its upper area 16, the window 15 thereby has the typical features of an Internet browser, namely the Netscape menu line with functions such as "datafile", "process" as well as "refresh", as well as the indication of the currently called http network address in the filed 19.

A selection can thereby be made in the selection field 26 as to whether the data files stored in the upload list 74 or the data files stored in the library 75 are to be displayed in the selection list 21. In the condition shown in FIG. 3, the data files of the upload list 74 are displayed in the list 21.

On the one hand, properties of a datafile activated in the upload area are indicated in the area 114 (description), for example its format "PS" for a PostScript datafile. On the other hand, desired printing parameters are displayed in the area 14 and can be selected, for example the number of copies per printout or the type of output, simplex/duplex printing.

The output in datafile (store) and/or the output to a printer (print) can be stared with the buttons 26, 27 and 28.

FIG. 4 shows the display window 15 in a condition that is reached after the load event started in FIG. 3. The particular "library" in field 25 thereby indicates that the list of the library 75 is displayed in the selection list 21.

Various documents in a document selection field 21 can be selected in a display area 20 of the current document "Pjmadmin.html". Typical properties of the currently selected documents are displayed in the area 22, for instance the name, the print data language, the number of copies, the page size, layout particulars as well as imposition parameters (impositioning).

Typical particulars that are printer-specifically required for the print job such as, for example, the resolution are deposited in the area 23.

Local data files of the client PC 2 can be displayed and administered in the display area 14. Print documents in the permanent memory (hard disks) of the client PC 2 can thereby be sought with the button 13. The name of an existing datafile for the search can be input in the field 12. A datafile of the client PC 2 can be transmitted onto the print server 3 (as an upload event) with the button 24, so that this datafile appears in the upload list 74.

Figure 5:
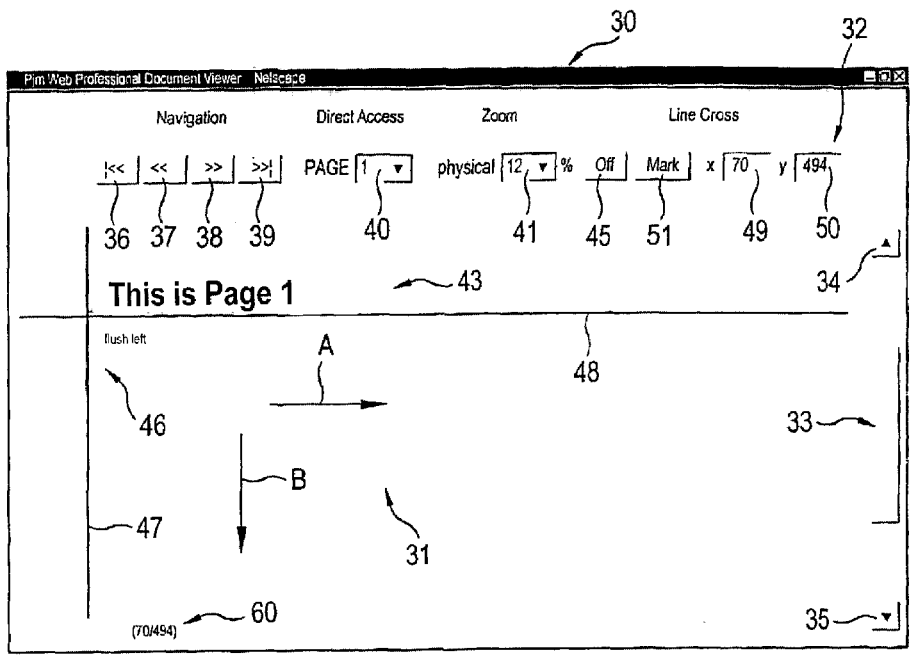
FIG. 5 is a first document display.

FIG. 5 shows how a document loaded into the browser (such as Netscape Navigator) is displayed and how the display is controlled with the JavaScript module "PDV-View.js" 9 (see Appendix 1). The document is thereby presented region-by-region, for example page-by-page, in a display region 31 of the display window 30. This display is controlled by the program "PDVViewImage.html" 11 (see Appendix 3).

The data files loaded in this way (for example, the datafile "Frame/A4.ps") are available in a rastered format (such as JPG) in the browser, whereby it is assured that the displayed information is identical pixel-by-pixel to the information that arises in the print image when the same datafile is printed out.

The viewer-specific menu line 32 is displayed in a display area lying above the display area 31. The display in the document display area 31 can thereby be modified via a plurality of control functions. First an upward or downward movement within the document can be accomplished in the document via the scroll bar 33 or the arrow keys 34 and 35 belonging thereto, as is customary in a standard browser.

Another possibility of the modifying the display of the document in the area 31 is to roam in the document with the arrow keys 36 (to the start of the document), 37 (up), 38 (down) and 39 (to the end of the document). Further, a specific page number can be input in the input field 40 in order to proceed directly to a specific page. The zoom factor with which the document is displayed in the area 31 can be specified in the field 41.

After pressing the viewer button 61 (FIG. 4), the display window 30 with the menu line 32 and the currently loaded document is displayed in the region 31 in the browser 7 or, respectively, in the display module 9 (viewer). The text 43 of page 1 of the document is thereby shown in FIG. 5; the text or, respectively, the information of page 2 of the currently loaded document is displayed in FIG. 6.

By pressing the button 45, the reticule 46 can be selectively mixed in or blanked out within the display area 31. The reticule 46 is thereby composed of a vertical line 47 and of a horizontal line 48.

The reticule is not visible when the image viewer (viewer 9) is initially started. It is turned on (activated) by actuating the button 45 and appears visible in the upper left corner of the display area 31. This corner defines the origin coordinates (X, Y)=(0, 0) within a coordinate system. The current coordinates of the reticule are thereby displayed in the browser status line 60 in two display fields 49 for the horizontal X-coordinate and 50 for the vertical Y-coordinate. The menu line 32 is thereby effected and controlled by the program "PDVViewControl.html" 10 (Appendix 2).

The current coordinates of the reticule can be retained, stored and displayed in the coordinate fields 49 and 50 with the marking key 51. A subsequent movement of the reticule in the horizontal or vertical direction no longer modifies the X-coordinate or, respectively, Y-coordinate values in the displayed coordinate display fields until the marking key is pressed again. The stored X-coordinates, or, respectively, Y-coordinates of the current reticule position are re-displayed by renewed pressing of the marking key.

The display text 43 of the document to be viewed, which is embedded in a first layer, can be seen within the display field 31. In a browser programming environment, such layers are carriers of graphic information. Differing from the graphic information in and of themselves, however, the layers are advantageously movable in browser environments. By embedding the graphic information in the layers, the information (lines of the reticule) are movable within a browser display in that the layer is moved in the browser. Dynamic elements whose position is variable are thus created within the browser environment.

In the present employment, the first layer, in which the graphic information of the document are stored, is not topically modified. A second layer, in which the vertical line 47 of the reticule 46 is stored, however, can be arbitrarily shifted in horizontal direction A within the boundaries of the document display area 31. The second line 48 of the reticule 46, which is likewise embedded in a third layer as a graphic information one pixel wide, can be arbitrarily vertically shifted along direction B in exactly the same way. The line is thereby presented by an elongation from a datafile with one pixel.

In data-oriented terms, the reticule 46 is coupled with the mouse 18 (FIG. 1) and, like a notoriously known mouse pointer, is automatically moved within the display area 31 in conjunction with a movement of the mouse. The reticule 46 can be uncoupled from the mouse by means of a mouse click with the left mouse button and remains standing at the current position within the document display region.

The momentary values within the X-Y coordinates (horizontal, vertical) of the reticule 46 can be displayed in the underlying text fields 49 and 50 by selecting the switch button 51. The current position of the reticule is visible in the status bar 60 of the browser.

To this end, the reticule must be visible and fixed. When the reticule 46—after it has been made mobile again with a renewed mouse click within the display field 31—is subsequently shifted again, then the display values in the fields 49 and 50 are preserved. The coordinate values correspond to individual pixel values on the X-Y axes.

The reticule can be directly positioned to the indicated coordinate position by inputting the X-coordinates or, respectively, Y-coordinates into the fields 49 and 50.

Figure 6:
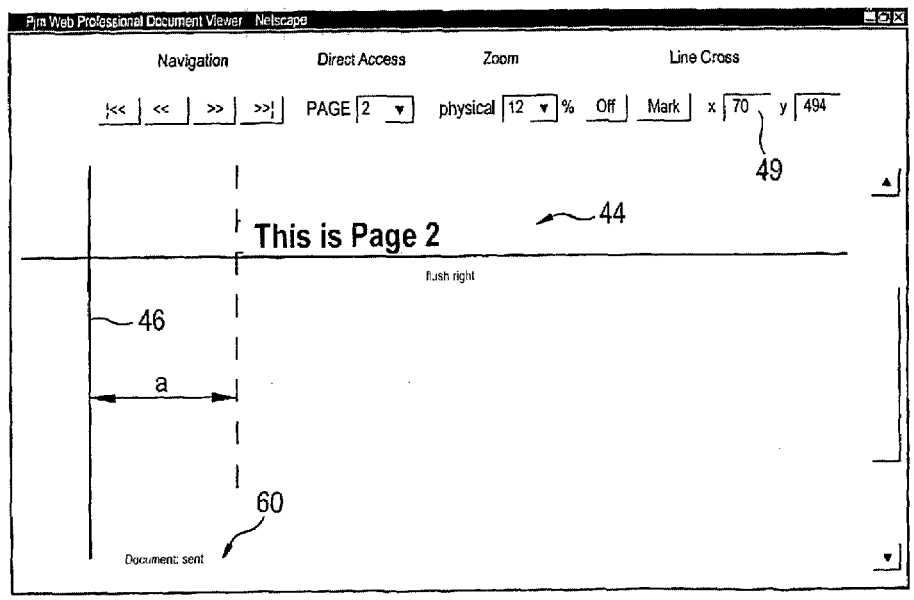
FIG. 6 is a second document display.

For checking the in-register nature of successive pages, it is expedient to position the reticule at a specific position, for example at X=70 and Y=494, and to then undertake a page change via one of the buttons 36, 37, 39, 39 or 40. In the comparison of FIGS. 5 and 6, for example, this is implemented with the pages 1 and 2, whereby it can be clearly seen that page 2 is positioned out-of-register relative to page 1. The horizontal distance 'a' between the line starts of the pages 1 and 2 can be identified by shifting the reticule 46 to the start of the text of page 2, and the number of pixels can be directly read in the field 49. The register correction value (the difference between the two positions of pages 1 and 2) that is thereby achieved and measured in pixels can then be corrected either automatically or by transmission onto a different system, for example into the controller of the printer 4, such that the in-register is restored in the ultimate printout.

The basis for the presentation of the reticule 46 is, on the one hand, the aforementioned layer technique and, on the other hand, two image data files with a respective, specifically identified image composed of a red-colored pixel for the two lines 47 and 48. The lines 47 and 48 that respectively extend up to the edges of the display region 31 thereby arise by elongation in respectively the horizontal or, respectively, vertical direction.

It can be particularly seen when switching from FIG. 5 or FIG. 6 that the position of the reticule, i.e. by the coordinate X, Y, is not modified as a result of a page change. Given fast scrolling (for example by a page change), the user can thus very quickly recognize whether there is a shift in view of the in-register quality in successive pages or, too, in pages that lie far apart.

On the other hand, the reticule is dynamically displaceable within the region 31. Such dynamic elements can be particularly realized by means of the layer technique in web browsers like the Netscape Communicator.

Exemplary embodiments of the invention have been described. It is thereby clear that a person skilled in the art could recite developments of the invention at any time. For example, dotted lines or other symbols could also be displayed instead of the reticule lines. The procedure of checking the in-register quality could also be automated, so that the reticule or the register lines are automatically modified, the correction values are automatically calculated and forwarded to a higher-ranking process controller.

The invention can be realized as a computer program as well as a computer program product or can be realized integrated in a computer and is especially advantageous, particularly in printing systems with connected print servers. It can thereby run on a server, on a client PC, a printer or another computer linked into a data network. Corresponding program data files can be stored on a data carrier or can be disseminated via LAN and WAN networks like the Internet.

Thus, the present invention provides a method for processing print data, whereby the print data are displayed on a display device before printing, whereby the print data are displayed together with a check device (reticule) that is displaceable at the display device. The print data may be present in a rastered format in which they are supplied to a printer device for printing. In one embodiment, the print data are displayed by means of a browser. In the method the position of the check device can be fixed on the display device. The check device of a preferred embodiment may comprise a line. Specifically, the check device is a reticule and the two axes (lines) of the reticule are displaceable independently of one another on the display device. The positions of the two axes (lines) of the reticule can be fixed independently of one another on the display device.

Preferably, the method provides that the check device is displaced and/or fixed on the display device with an input device (such as a mouse, track ball, touch panel). The position of the check device on the display device is preferably automatically acquired in a coordinate system and the coordinate values (x, y) corresponding to the position are stored. The print data are processed in a first transparent layer (dynamic element, layer) and the check device (reticule) is processed in at least one second transparent layer.

The present method provides that the check device can comprise a first sub-element (horizontal line) and a second sub-element (vertical line) and each sub-element is processed in a separate layer. According to one embodiment, the print data are divided into a plurality of pages and, for checking the in-register quality of successive pages, the check device (one or both axes of the reticule) is positioned and fixed at a predetermined edge position of a first page and at least one following page is then displayed together with the check device.

The display of the check device can be turned off. Predetermined pages of a document corresponding may be displayed with a page button displayed on the display device. The check device can be displayed at a predetermined position by means of values that are input or selected at a position button displayed on the display device.

The present invention also provides computer software that effects a method of execution according to the foregoing when loaded on a computer. A computer program product that effects the method execution when loaded on a computer is within the scope of the present invention. The present invention extends to a computer system that effects a method execution for the present method. A printing system comprising the computer system is also encompassed.

Although other modifications and changes may be suggested by those skilled in the art, it is the intention of the inventors to embody within the patent warranted hereon all changes and modifications as reasonably and properly come within the scope of their contribution to the art.

The invention claimed is:

1. Computer software stored on a computer readable media that when loaded on a computer is executed to effect a method comprising the following steps:
   displaying the print data on a display device using an internet browser before printing the print data, the print data being displayed in a rastered data format and being displayed in a way that the displayed print data is identical pixel-by-pixel to information that appears on a print image when the print data is printed:
   said displaying step including:
      displaying the print data of one page of the plurality of pages on the display device using the internet browser;
      displaying a check element on the display device using the internet browser, said check element being displayed along with the print data of said one page, said check element being displaceable at the display device such that the check element is positionable at a predetermined position relative to an edge of the displayed print data of said one page;

displaying the print data of another page of the plurality of pages on the display device using the internet browser, said another page being a different page than said one page; and displaying on the internet browser said check element together with the print data of said another page, said check element being displayed at said predetermined position, said displaying the print data of said another page with said check element at said predetermined position of an edge enabling a user to determine if a position of the print data of said another page is in register accuracy with the position of the edge of the print data of said page by comparing the predetermined position of the check element with the edge of the print data of said another page; and dragging the check element from the predetermined position to the position at the edge of the print data of said another page to obtain a register correction value when the edge of the print data of said another page is not at the predetermined position of the check element.

2. A computer program product including a computer readable media that when loaded on a computer is executed to effect a method comprising the steps of:

displaying the print data on a display device using an internet browser before printing the print data, the print data being displayed in a rastered data format and being displayed in a way that the displayed print data is identical pixel-by-pixel to information that appears on a print image when the print data is printed;

said displaying step including:

displaying the print data of one page of the plurality of pages on the display device using the internet browser;

displaying a check element on the display device using the internet browser, said check element being displayed along with the print data of said one page, said check element being displaceable at the display device such that the check element is positionable at a predetermined position relative to an edge of the displayed print data of said one page;

displaying the print data of another page of the plurality of pages on the display device using the internet browser, said another page being a different page than said one page; and displaying on the internet browser said check element together with the print data of said another page, said check element being displayed at said predetermined position, said displaying the print data of said another page with said check element at said predetermined position of an edge enabling a user to determine if a position of the print data of said another page is in register accuracy with the position of the edge of the print data of said one page by comparing the predetermined position of the check element with the edge of the print data of said another page; and dragging the check element from the predetermined position to the position at the edge of the print data of said another page to obtain a register correction value when the edge of the print data of said another page is not at the predetermined position of the check element.

3. A computer system that is operable to perform the steps of:

displaying the print data on a display device using an internet browser before printing the print data, the print data being displayed in a rastered data format and being displayed in a way that the displayed print data is identical pixel-by-pixel to information that appears on a print image when the print data is printed;

said displaying step including:

displaying the print data of one page of the plurality of pages on the display device using the internet browser;

displaying a check element on the display device using the internet browser, said check element being displayed along with the print data of said one page, said check element being displaceable at the display device such that the check element is positionable at a predetermined position relative to an edge of the displayed print data of said one page;

displaying the print data of another page of the plurality of pages on the display device using the internet browser, said another page being a different page than said one page; and displaying on the internet browser said check element together with the print data of said another page, said check element being displayed at said predetermined position, said displaying the print data of said another page with said check element at said predetermined position of an edge enabling a user to determine if a position of the print data of said another page is in register accuracy with the position of the edge of the print data of said one page by comparing the predetermined position of the check element with the edge of the print data of said another page; and dragging the check element from the predetermined position to the position at the edge of the print data of said another page to obtain a register correction value when the edge of the print data of said another page is not at the predetermined position of the check element.

4. A printing system, comprising:

a computer system that is operable to perform the steps of:

displaying the print data on a display device using an internet browser before printing the print data, the print data being displayed in a rastered data format and being displayed in a way that the displayed print data is identical pixel-by-pixel to information that appears on a print image when the print data is printed;

said displaying step including:

displaying the print data of one page of the plurality of pages on the display device using the internet browser;

displaying a check element on the display device using the internet browser, said check element being displayed along with the print data of said one page, said check element being displaceable at the display device such that the check element is positionable at a predetermined position relative to an edge of the displayed print data of said one page;

displaying the print data of another page of the plurality of pages on the display device using the internet browser, said another page being a different page than said one page; and displaying on the internet browser said check element together with the print data of said another page, said check element being displayed at said predetermined position, said displaying the print data of said another page with said check element at said predetermined position of an edge enabling a user to determine if a position of the print data of said another page is in register accuracy with the position of the edge of the print data of said one page by comparing the predetermined position of the check element with the edge of the print data of said another page; and dragging the check element from the predetermined position to the position at the edge of the print data of said another page to obtain a register correction value when the edge of the print data of said another page is not at the predetermined position of the check element.

5. A method for processing print data of a print job divided into a plurality of pages, comprising the steps of:

displaying the print data on a display device using an internet browser before printing the print data, the print data being displayed in a rastered data format and being displayed in a way that the displayed print data is identical pixel-by-pixel to information that appears on a print image when the print data is printed;

said displaying step including:

displaying the print data of one page of the plurality of pages on the display device using the internet browser;

displaying a check element on the display device using the internet browser, said check element being displayed along with the print data of said one page, said check element being displaceable at the display device such that the check element is positionable at a predetermined position relative to an edge of the displayed print data of said one page;

displaying the print data of another page of the plurality of pages on the display device using the internet browser, said another page being a different page than said one page; and displaying on the internet browser said check element together with the print data of said another page, said check element being displayed at said predetermined position, said displaying the print data of said another page with said check element at said predetermined position of an edge enabling a user to determine if a position of the print data of said another page is in register accuracy with the position of the edge of the print data of said one page by comparing the predetermined position of the check element with the edge of the print data of said another page; and dragging the check element from the predetermined position to the position at the edge of the print data of said another page to obtain a register correction value when the edge of the print data of said another page is not at the predetermined position of the check element.

6. A method according to claim 5, further comprising the step of: selectively fixing of a position of the check element on the display device.

7. A method according to claim 5, wherein the check element includes a line.

8. A method according to claim 7, wherein said check element is a reticule, and wherein said step of dragging the check element includes selectively displacing two lines of said reticule independently of one another on the display device.

9. A method according to claim 8, further comprising the step of:

fixing the positions of the two lines of the reticule independently of one another on the display device.

10. A method according to claim 5, wherein said step of dragging the check element obtains the register corrections value in pixels.

11. A method as claimed in claim 10, wherein said input device is one of a mouse, a track ball and a touch panel.

12. A method as claimed in claim 5, further comprising the step of: fixing the check element on the display device with an input device.

13. A method as claimed in claim 12, wherein said input device is one of a mouse, a track ball and a touch panel.

14. A method according to claim 5, further comprising the steps of:

automatically acquiring a position of the check element on the display device in a coordinate system; and storing coordinate values corresponding to the position.

15. A method according to claim 5, further comprising the steps of:

processing the print data in a first transparent layer; and processing the check device in at least one second transparent layer.

16. A method as claimed in claim 15, wherein said first transparent laying includes a dynamic element.

17. A method according to claim 15, wherein said check element includes a first sub-element and a second sub-element and each sub-element is processed in a separate layer.

18. A method as claimed in claim 17, wherein said first sub-element is a horizontal line and said second sub-element is a vertical line.

19. A method according to claim 5, further comprising the step of:

positioning and fixing the check element at said predetermined edge position of a first page.

20. A method as claimed in claim 19, wherein the positioning includes positioning of one line of a reticule.

21. A method as claimed in claim 19, wherein the positioning includes positioning of both lines of a reticule.

22. A method according to claim 5, further comprising the step of:

selectively turning off display of the check element.

23. A method according to claim 5, further comprising the step of:

displaying predetermined pages of a document with a page button displayed on the display device.

24. A method according to claim 5, further comprising the step of: receiving a user input of position values or selection of a position button by which the check element is displayed at the predetermined position on the display device.

* * * * *